United States Patent Office 3,532,461
Patented Oct. 6, 1970

3,532,461
PROCESS FOR PREPARING CHEMICAL COMPOUNDS CONTAINING TRIVALENT PHOSPHORUS
David D. Whyte, Wyoming, and Phillip F. Pflaumer and Thomas S. Roberts, Hamilton, Ohio, assignors to The Procter & Gamble Company, Cincinnati, Ohio, a corporation of Ohio
No Drawing. Filed July 20, 1966, Ser. No. 566,482
Int. Cl. C01b 25/12; C07f 9/02
U.S. Cl. 23—165                           13 Claims

ABSTRACT OF THE DISCLOSURE

A process for preparing an anhydride of trivalent phosphorus reaction product by reating elemental phosphorus, oxygen, and at least one carbon oxide at a temperature above 1500° C. until complete chemical equilibrium is achieved. The reaction product is useful for preparing phosphorus trioxide, phosphorus acid and ethane-1-hydroxy-1,1-diphosphonic acid.

---

This invention relates to a process for the preparation of chemical compounds containing trivalent phosphorus. The invention in particular relates to a process for the preparation of a composition of matter which comprises essentially anhydrides of trivalent phosphorus, and, in addition, it relates to the product made by this process. The invention also provides a process for the preparation of compounds containing trivalent phosphorus which have heretofore been difficult to prepare, such as phosphorus trioxide $P_4O_6$, ethane-1-hydroxy-1,1-diphosphonic acid $CH_3C(OH)(PO_3H_2)$ and salts thereof, phosphorus acid $H_3PO_3$, and the like.

Phosphorus trioxide, $P_4O_6$, for example, has not previously been prepared on a commercial scale. One known laboratory scale preparation from burning phosphorus is that described by Wolf and Schmager in Berichte 62(1), 771–786 (1929). The yield of phosphorus trioxide obtained by that procedure rarely exceeds about 50% and is usually substantially less than this amount. The balance 50% and higher consists of by-products such as $P_4O_{10}$, red phosphorus and the like. The present process unexpectedly makes possible substantially higher yields based on the starting phosphorus raw material and thus represents a valuable improvement and advance in the art.

Ethane-1-hydroxy-1,1-diphosphonic acid and watersoluable salts thereof are valuable builders for detergent compositions as described in U.S. Pat. 3,159,581, dated Dec. 1, 1964. Several routes are known for the preparation of this material but, the present invention represents an improved new and useful process for the preparation of this valuable builder material.

Likewise, phosphorus acid $H_3PO_3$, is still a relatively expensive chemical compound because known preparative methods are also expensive and inefficient. The present invention represents a substantial improvement in the sense that high yields of phosphorus acid are provided relatively inexpensively with a possible resulting decrease in the commercial price of this important chemical.

Thus, it will be seen that the present invention is broadly useful for the preparation of valuable chemical compounds.

The preparation of compounds containing trivalent phosphorus has been rendered difficult, in part, by the complex nature of the phosphorus atom which can have several different valences ranging from $-3$ as in phosphine $PH_3$, to $+5$ as in phosphorus pentoxide $P_2O_5$, pyrophosphoric acid $H_4P_2O_7$, phosphate salts $M_3PO_4$, and metaphosphate salts $MPO_3$. Many compounds are known containing phosphorus having valences between $-3$ and $+5$ such as, for example, phosphorus monoxide $P_2O$, phosphorus trioxide $P_4O_6$, phosphite salts $M_3PO_3$, phosphorus tetroxide $P_2O_4$, hypophosphoric acid $H_4P_2O_6$, and the like.

In any given reaction involving phosphorus, care must be exercised to achieve the correct set of reaction conditions which favor the preparation of any desired compound.

It has been especially difficult to prepare chemical compounds containing trivalent phosphorus because of the tendency for such compounds, being intermediate the valence spectrum for phosphorus, to disproportionate to other higher or lower valence compounds. This can perhaps best be appreciated from the fact, as noted above, that phosphorus trioxide $P_4O_6$, has not previously been prepared on a commercial scale.

It has now been discovered that a composition of matter comprising essentially anhydrides of trivalent phosphorus is prepared by a process which comprises the step of reacting elemental phosphorus, oxygen, and at least one carbon oxide at a temperature in excess of about 1500° C., until substantially complete chemical equilibrium is achieved.

For purposes of the present invention, the term "substantially complete chemical equilibrium" is intended to mean that a reaction product is formed in which greater than about 50% of the phosphorus in the reaction product is present as trivalent phosphorus, and preferably greater than about 70% is present as trivalent phosphorus. As such, the reaction product is comprised essentially of anhydrides of trivalent phosphorus.

Chemical equilibrium, as defined above, can be achieved according to this invention within reaction times as brief as one millisecond or less due to the intense speed of reaction and depending on the heat of reaction. More usually, chemical equilibrium is reached within about 50 milliseconds under usual operating conditions. The length of the reaction is dependent upon the specific reactants employed and the conditions specified herein. In this context, however, it can be stated that the reaction to reach equilibrium requires broadly from about 1 millisecond up to about 1 second, and preferably from about 5 milliseconds up to about 50 milliseconds. Once chemical equilibrium is achieved, the reaction product can be maintained indefinitely provided only that the temperature is maintained in excess of about 1500° C. The reaction is highly exothermic and rapid. For this reason, the reaction does not require an external heat source or preheating step. The reaction is initiated upon contact of the reactants. If desired, however, the reactants, especially the elemental phosphorus, can be preheated to a temperature in the range of from about 200° C. to about 400° C., and preferably from about 250° C. to about 375° C. before being fed to the reaction zone. The elemental phosphorus and oxygen gas reacts so rigorously that ignition occurs taking the form of a visible blue flame.

The reaction can take place in any form of reactor designed to withstand the vigorous reaction conditions described herein. The term "reaction zone" is used hereinafter to designate the site of the reaction. The term "reaction zone" does not imply any particular vessel, or confined area, but only the place at which the dynamic reaction occurs.

The reaction temperature should be in excess of about 1500° C., and preferably in excess of about 2500° C. Below 1500° C., the yield of anhydrides of trivalent phosphorus formed begins to drop off, especially if the carbon oxide employed is carbon dioxide for reasons explained below. The upper limit for the reaction temperature is set by practical considerations more so than by requirements of the reaction itself. Generally, no advantage has been seen for exceeding about 5000° C., and it is, therefore, preferred to stay below about 4500° C. As mentioned above, an external heat source can be employed to achieve or maintain reaction temperatures in excess of 1500° C. Usually, the exothermic nature of the reaction provides a sufficiently high reaction temperature within the range of about 1500° C. to about 5000° C. There is moreover no need to restrain or control the temperature below 5000° C. If the reaction temperature, due to its exothermic nature or for some other reason, exceeds the 5000° C. limit no harm is caused to the trivalent phosphorus species formed during the reaction.

Elemental phosphorus is a non-metallic element that exists in several allotropic forms (white, yellow, red or black). All of these forms can be used in the present invention but the white or yellow phosphorus (the terms are used interchangeably) are the preferred forms. The term elemental phosphorus, as used herein, designates these allotropic forms.

White phosphorus (yellow phosphorus) exists as $P_4$, having a tetrahedral molecular structure. It is a brittle, waxy solid which has a melting point of 44.1° C., and a boiling point of 280° C. Its vapor density corresponds to a formula of $P_4$. It is virtually insoluble in water and alcohol, moderately soluble in chloroform and benzene, and very soluble in carbon disulfide.

Since elemental phosphorus melts at 44.1° C., it is fed conveniently to the reaction as a liquid, or alternatively, it is vaporized and fed to the reaction either as a pure vapor or diluted with an inert diluent or carrier gas such as nitrogen, argon and the like.

The oxygen gas can be fed to the reaction also either as pure oxygen gas or diluted with a diluent or carrier gas such as nitrogen, argon, and the like. Pure oxygen is the preferred form because it produces a higher flame temperature than a diluted stream of oxygen. Dilutions as high as five parts diluent or higher per part of oxygen can be used, provided the flame temperature is above the previously-described reaction temperature.

The carbon oxide is selected from carbon monoxide, carbon dioxide, or a mixture thereof. The carbon oxides can be used in pure form or in admixture with an inert carrier gas such as nitrogen, argon and the like. The carbon oxides can also be formed in situ by reacting appropriate amounts of carbon and oxygen.

The reactants can be fed to the reaction zone in any convenient manner. Many variations for bringing the reactants to the reaction will be apparent from the following discussion and examples. Since the elemental phosphorus and the oxygen react so abruptly, they are usually fed in separate streams to the reaction. The carbon oxide can also be fed separately but, on the other hand, can be mixed with either the feed stream of elemental phosphorus or the feed stream of the oxygen prior to the reaction zone.

It has been discovered that the molar proportions of the reactants have a vital effect upon the formation of high yields and trivalent phosphorus and for this reason the molar proportions used are critical to the attainment of the primary objectives of this invention. For reasons given below, the molar proportions of reactants depend in great measure upon which specific carbon oxide is used, carbon monoxide or carbon dioxide.

When the reactants are elemental phosphorus:oxygen:carbon monoxide, the molar proportions should be respectively in the range of from about 1:2.5:1 to about 1:6:15, and preferably from about 1:3:2 to about 1:5:10.

When the reactants are elemental phosphorus:oxygen:carbon dioxide, the molar proportions should be respectively in the range of from about 1:1:10 to about 1:4:1, and preferably from about 1:2:8 to about 1:3:2.

As mentioned above, these essential molar proportions are based on the discovery of the interrelated behavior and functions of oxygen and the carbon oxide during the reaction. First of all, sufficient oxygen must be present to oxidize substantially all of the elemental phosphorus to at least a trivalent state. The oxidizing gas can be that fed to the system in the oxygen feed stream. A portion can also be supplied from a carbon dioxide reactant which dissociates at the elevated temperatures to oxygen and carbon monoxide. Secondly, while the exact mechanism of the reaction is not completely understood, it is believed that the carbon monoxide serves as a reducing agent for pentavalent phosphorus $P_4O_{10}$, which forms during the reaction. The carbon monoxide also appears to decrease the amount of trivalent phosphorus which has a tendency to revert back to elemental phosphorus. The carbon monoxide is also capable of functioning as an oxidizing agent but not as effectively as oxygen. It will be seen, therefore, that the presence of a carbon monoxide reducing agent principally serves to decrease the amount of trivalent phosphorus species such as $P_4O_6$ which is disproportionated to $P_4O_{10}$ and elemental phosphorus. The molar proportions given above also insure that sufficient carbon monoxide is supplied to react with any excess oxygen which may be present to form carbon dioxide, and still provide for a residual amount of carbon monoxide in the reaction.

In the case of a carbon/oxide feed, it is this carbon oxide which performs as a reducing agent. In the case of a carbon dioxide feed, the carbon dioxide dissociates at the elevated temperature to oxygen and carbon monoxide. The oxygen so formed is available to oxidize elemental phosphorus, and the carbon monoxide so formed is available to effectively reduce any pentavalent phosphorus to a trivalent state, e.g., $P_4O_6$. In view of this dissociation which carbon dioxide undergoes, a lesser amount of oxygen needs to be fed to the reaction when carbon dioxide constitutes the carbon oxide reactant.

If less than the above-stated lower proportions of oxygen and carbon oxides are used, undesirably-low yields of anhydrides of trivalent phosphorus are formed. On the other hand, if more than the upper proportions are used, the result is a considerable waste of materials without providing any appreciable benefit to the process.

The essential requirements for the molar proportions of the reactants can also be explained by pointing out that theoretically three moles of oxygen are necessary to oxidize one mole of phosphorus $P_4$, to a trivalent state such as is present, for example, in an anhydride of trivalent phosphorus, e.g., $P_4O_6$, and that the reaction at equilibrium should preferably contain carbon monoxide and carbon dioxide. For purposes of computation, the reactants can be thought of as containing phosphorus, oxygen and carbon. The molar proportion of carbon to phosphorus should be between 1:1 to about 15:1, preferably between 2:1 and 10:1. The amount of oxygen can be broadly determined by the inequality: ½(moles carbon)+2≤moles $O_2$≤(moles carbon)+4; and preferably the oxygen value should comply with the following inequality:

½(moles carbon)+3≤(moles $O_2$)≤(moles carbon)+3

It can be seen, therefore, within the framework that the carbon and oxygen can be supplied by a mixture of carbon monoxide and oxygen, a mixture of carbon dioxide and oxygen or a mixture of carbon monoxide, carbon dioxide, and oxygen.

As mentioned above, the reaction is a very dynamic one whose reaction product is impossible to describe definitely. It is postulated, however, that a dynamic state of equilibrium is attained during the reaction in which an atom of phosphorus is repeatedly being oxidized from a trivalent state to a pentravalent state and then being reduced to a trivalent state. The cycle is then repeated.

The presence of carbon monoxide and carbon dioxide both during the reaction and chemical equilibrium unexpectedly appears to promote and favor the formation of a composition comprising essentially anhydrides of trivalent phosphorus. Thus, the composition formed by the reaction contains greater than about 50% of the phosphorus present as trivalent phosphorus, and preferably greater than about 70% present as trivalent phophorus. The trivalent phosphorus is present as anhydrides of trivalent phosphorus, principally phosphorus trioxide $P_4O_6$, but also as anhydrides such as $P_4O_7$ and $P_4O_8$. By carefully controlling the reaction, the composition of the reaction product can be comprised totally of anhydrides of trivalent phosphorus and typically about 75%–95% anhydrides of trivalent phosphorus, about 5%–25% anhydrides of pentavalent phosphorus, and about 0%–5% unoxidized phosphorus.

Following the formation of the reaction mixture comprising essentially anhydrides of trivalent phosphorus from the reaction of elemental phosphorus, oxygen and a carbon oxide, the present invention has special embodiments involving an additional process step.

This additional step comprises quenching very rapidly the hot reaction product comprising essentially anhydrides of trivalent phosphorus and which has substantially achieved chemical equilibrium. The quenching time should not exceed about 3 seconds, and preferably should be less than 1 second. The quenching time (Q.T.) as the term is used in this invention, is the time required to reduce the temperature of the reaction mixture which is at substantially chemical equilibrium and a temperature in excess of about 1500° C. down to a temperature below about 500° C.

It has been discovered that if longer quenching times are used, that is, if the reaction mixture is allowed to cool more slowly to a temperature below about 500° C., the anhydrides of trivalent phosphorus comprising the reaction mixture are exposed for an undesirably long time to a temperature range in which the anhydrides of trivalent phosphorus, e.g., $P_4O_6$, are thermally unstable and in which the carbon oxide reactants are ineffective in preventing disproportionation to undesired by-products. This discovery is based on the fact that as quenching times are increased, the amount of trivalent phosphorus in the quenched product decreases while the yield of undesired pentavalent phosphorus and allotropic forms of phosphorus, e.g., red phosphorus, are increased.

It is important that the quenching step effectively reduce the temperature of the hot reaction product comprising essentially anhydrides of trivalent phosphorus to a temperature of about 500° C., and preferably below about 400° C. The disproportionation reaction discussed above to which the anhydrides of trivalent phosphorus are very sensitive is favored and becomes more pronounced at temperatures above about 500° C. For this reason, 500° C. is the maximum permissible temperature following the quenching in order to preserve the trivalent phosphorus species.

One of the special advantages of the present invention is the aspect of flexibility that is available in the quenching step and the product obtained as a result of the quenching step. The quenching step can be performed in several ways.

In the following discussion, three separate quenching embodiments are disclosed, each one being subject to the quenching conditions outlined above. The three quenching embodiments are: (1) quenching the hot reaction product comprising essentially anhydrides of trivalent phosphorus by passing said hot reaction product through a cooling zone comprising a cooled tube with recovery of phosphorus trioxide, $P_4O_6$; (2) quenching the hot reaction product comprising essentially anhydrides of trivalent phosphorus by treating said hot reaction product with water as, for example, by a water spray with formation of phosphorus acid; and (3) quenching the hot reaction product comprising essentially anhydrides of trivalent phosphorus by treating said hot reaction product with acetic acid with formation of ethane-1-hydroxy-1,1-diphosphonic acid. Each of these are discussed and illustrated below.

Quenching by means of a cooling zone

Quenching the hot reaction mixture by means of passing the hot reaction product through a cooling zone results in the recovery of phosphorus trioxide. This represents perhaps the first known commercially-feasible method for preparing and recovering phosphorus trioxide.

The phosphorus trioxide $P_4O_6$, is present in hot reaction mixture as an anhydride of trivalent phosphorus, and represents the bulk of the hot reaction product once chemical equilibrium is achieved. The recovery of this material is quite simple according to this invention and is accomplished by passing the hot reaction mixture, which is in the form of colorless, incandescent gaseous composition, from the reaction zone through an expansion nozzle into a relatively cool zone which can, for example, be in the form of a cooled tube. The tube can be a metal tube, or other suitable material, which is surrounded by a cooling medium such as cold water, etc. The temperature of the cooled tube needs only to be about room temperature to effect satisfactory quenching. The only requirement for the temperature of the cooling zone is that it must accomplish the quenching step in the time limits described above. This procedure quenches the temperature of the hot gaseous reaction mixture to below 500° C. and the $P_4O_6$ can be collected by passing the quenched gases through a series of cold traps. The cold traps contain essentially pure phosphorus trioxide, $P_4O_6$. Before entering the cold traps, the quenched gases can be padded through a glass wool filter which serves to remove any pentavalent anhydrides present such as $P_4O_{10}$ as well as any red phosphorus which may be present.

According to another procedure for recovering a pure solid phosphorus trioxide product, following the quenching step the quenched gas stream can be further cooled to a temperature in the range of 0–100° C. and then passed through a series of knockout pots in which conventional impingement techniques are used to remove the liquid and solid products from the gas stream. A final step in this procedure includes a stripping column and condenser operating at, for example, 25–30° C., to separate the remaining $P_4O_6$ from the gas stream.

Quenching by means of water treatment

Quenching the hot reaction mixture by means of a water treatment results in the formation of acids corresponding to anhydrides of phosphorus present in the hot reaction mixture. Since, according to this invention, the hot reaction mixture comprises essentially anhydrides of trivalent phosphorus, the result is that a water treatment produces essentially phosphorous acid and minor amounts of phosphoric acid (from the pentavalent phosphorus anhydrides).

The water treatment of the hot reaction mixture can comprise a series of water sprays which at the same time scrub the phosphorus compounds from the gaseous reaction stream. The water containing phosphorus acid from these sprays can then be recycled to the spray nozzles thereby building up a high concentration of phosphorous acid in the aqueous solution. The water sprays can be at room temperature or any other relatively cool temperature sufficient to achieve the quenching step within the required time limits set forth above. The effluent from the water treatment is a clear fuming acid mixture.

The amount of water employed is not critical and any amounts can be used which achieve the quenching requirements.

Quenching by means of acetic acid

Quenching the hot reaction mixture by means of treating with acetic acid results in the formation of ethane-1-hydroxy-1,1-diphosphonic acid. The acetic acid treatment can be performed by replacing the water in the foregoing method with acetic acid. Thus, an acetic acid spray, or a series of such sprays, leads to the formation of ethane-1-hydroxy-1,1-diphosphonic acid. More particularly, in order to practice this process for the preparation of ethane-1-hydroxy-1,1-diphosphonic acid, according to the reaction described in copending patent application Ser. No. 554,134, filed May 31, 1966, the anhydrides of trivalent phosphorus can be recovered by scrubbing them from the carbon monoxide-carbon dioxide gas phase with acetic acid using a conventional packed tower. The feed rates of acetic acid and the anhydrides of trivalent phosphorus, e.g., $P_4O_6$, are controlled so that the effluent from the tower contains the desired molar proportions of acetic acid to anhydride of trivalent phosphorus, $P_4O_6$ as described in the aforesaid copending patent application. It is intended that for this embodiment of the present invention, i.e., formation of ethane-1-hydroxy-1,1-diphosphonic acid, the disclosure of the copending application is incorporated by reference thereto.

As more fully explained in the copending patent application, the major proportion of the reaction product between the acetic acid and the anhydride of trivalent phosphorus $P_4O_6$ is ethane-1-hydroxy-1,1-diphosphonic acid or condensates thereof which can be readily converted to free acid. The molar proportions of the acetic acid to the anhydride of trivalent phosphorus is from about .75:1 to about 50:1 and more preferably, from about 2:1 to about 20:1.

Due to the fact that the reaction time between the acetic acid and the anhydrides of trivalent phosphorus is limited by the necessity of having the quenching step be so short, the reaction product from these two materials results in the formation of a substantial proportion of precursors of ethane-1-hydroxy-1,1-diphosphonic acid, such as acetylated phosphite compounds. A digestion step can be used to convert these precursors to ethane-1-hydroxy-1,1-diphosphonic acid. The digestion step comprises maintaining the acetic acid-anhydride of trivalent phosphorus reaction product at a temperature of from about 70° C. to about 170° C., preferably from about 90° C. to about 150° C., for a period of time of from about 1 minute to about 4 hours, and preferably from about 5 minutes to about 1½ hours. The digested reaction product is then hydrolyzed by the addition of water to the reaction mixture to form a hydrolyzed solution containing free ethane-1-hydroxy-1,1-diphosphonic acid and acetic acid. The amount of water employed in the hydrolysis step should preferably equal or exceed the stoichiometric amount necessary to form ethane - 1 - hydroxy-1,1-diphosphonic acid.

The hydrolysis step can be carried out at room temperature but usually higher temperatures are used. A satisfactory rate of hydrolysis is attained in the range of 90° C. to about 170° C., but it is preferred to operate in the range of about 100° C. to 150° C. Typically, the hydrolysis can be carried out in a period ranging from a few seconds to four hours, and preferably from about 3 minutes to about 2 hours.

Following the hydrolysis reaction, the hydrolyzed reaction product contains the desired ethane-1-hydroxy-1,1-diphosphonic acid.

Separation and recovery of the ethane-1-hydroxy-1,1-diphosphonic acid can be by any manner. If the hydrolysis is performed so that the hydrolyzed material contains only a small amount of water, e.g., 1% or less, the mixture can be cooled to a temperature in the range of 10° C.–50° C., typically about 30° C., while being gently stirred. The ethane-1-hydroxy-1,1-diphosphonic acid begins to crystallize as the hydrolyzed mixture cools. At about 30° C. the crystal formation requires about 1 to 2 hours. The mixture can be seeded with ethane-1-hydroxy-1,1-diphosphonic acid crystals to accelerate the crystallization process. The crystallized acid can then be recovered by filtration, and neutralized by reaction with a suitable base such as sodium hydroxide.

In addition to providing a feasible and commercial method for preparing phosphorus trioxide on a continuous basis, this invention also results in higher yields of anhydrides of trivalent phosphorus than are obtained by any previously known method. Thus while the previously-mentioned method of Wolf and Schmager gives a product containing a maximum of 50–55% $P_4O_6$ and the method of Heinz and Thilo (German Democratic Republic Pat. No. 26,660) using $N_2O$ gives yields of 40–50% $P_4O_6$, the product obtained according to the present invention contains at least 85 to 90% trivalent phosphorus. It can be seen that this process achieves the high yield of trivalent phosphorus while at the same time requiring relatively simple equipment and using commonly available raw materials, namely, phosphorus, oxygen, carbon monoxide, and carbon dioxide.

The following examples are illustrative of the present invention. They are not intended to in any way be limiting on the full scope of the invention as claimed below.

The examples show the preparation of a novel composition of matter comprising essentially anhydrides of trivalent phosphorus and its use as an intermediate in the preparation of such useful materials as phosphorus acid, phosphorus trioxide and ethane-1-hydroxy-1,1-diphosphonic acid.

EXAMPLE I

A composition of matter containing 84% anhydrides of trivalent phosphorus was prepared by the combustion of phosphorus vapor with oxygen and carbon dioxide. The phosphorus vapor was fed to the burner by passing 2.6 gms./min. (0.059 mol) of carbon dioxide and 10 gms./min. of nitrogen (0.36 mol) through a bed of molten yellow phosphorus at a temperature of 216° C. and a pressure of 42 p.s.i.a. Based on the establishment of equilibrium between the phases, this resulted in a phosphorus feed rate of 4.9 gms./min. (0.0395 moles/min.) in the carbon dioxide-nitrogen mixture. The phosphorus feed stream was superheated to 285° C. and passed through an atomizing nozzle where it was intimately mixed with a 4.6 gms./min. (0.144 mole/min.) stream of oxygen at 250° C. These feed rates created mole ratios, $P_4:O_2:CO_2$ of 1:3.65:1.48. Upon mixing, the phosphorus spontaneously ignited and burned in a four-inch section of ¾″ pipe before being quenched by a water spray at 20° C. The residence time in the reaction zone was about 15 milliseconds, during which time chemical equilibrium was achieved, and quenching to a temperature of less than 30° C. occurred so rapidly as to be unmeasurable. Based on calculations, the quenching time was on the order of a few milliseconds, i.e., about 10 milliseconds. The water solution was collected and weighed. A sample of the water solution was hydrolyzed for two hours at 100° C., filtered, concentrated by vacuum evaporation, neutralized to pH 9 with NaOH and analyzed by NMR for percentages of trivalent phosphores and pentavalent phosphorus. Another sample of water solution was hydrolyzed, filtered, and titrated with NaOH to determine the amount of acid present. The acid titration and the filter cake weight were used to determine the conversion of phosphorus. The conversion of phosphorus was determined as 98.3 mole percent, and of the reacted phosphorus the yield of trivalent phosphorus by NMR was 84% with the balance being pentavalent phosphorus species. An overall yield of 82% of phosphorus acid was obtained.

Using the feed rates and the product analyses, it is possible to estimate accurately the adiabatic flame temperature in the burner. A simple energy balance is written equating the energy released in the reaction to the sensible heat rise of the materials present.

$$m_r \overline{C}p(Tr-298) - \Delta H_r = m_p \overline{C}p(T-298)$$

where $m$=gm. moles ($r$=reactants, $p$=products)
$\overline{C}p$=average specific heat cal./g. mole °K.
$Tr$=temperature of reactants—K°.
$T$=temperature of products—K°.
$\Delta H_r$=heat of reaction at 298° K. cal.

Using the data above, it is possible to use the above equation to estimate accurately the flame temperature, $T$.

$$mr\overline{C}p(Tr-298) = [(m\overline{C}p)_{N_2} + (m\overline{C}p)_{CO_2} + (m\overline{C}p)_{P_4}](558-298) + (m\overline{C}p)_{O_2}(523-298)$$

Substituting and performing indicated operations yields $$mr\overline{C}p(Tr-298) = 1250 \text{ cal./min.}$$

The heat of reaction $\Delta H_r$ is calculated from the feed rates and the product yield and composition.

$$\Delta H_r = m_{P_4O_6}(\Delta H_{P_4O_6}) + m_{P_4O_{10}}(H_{P_4O_{10}})$$

using data above $$\Delta H_r = 13{,}800 \text{ cal./min.}$$

In the products, it is assumed that only $O_2$ has been used to oxidize the $P_4$, and the $CO_2$ remains unchanged.

$$mp\overline{C}p(T-298) = [(m\overline{C}p)_{N_2} + (mCp)_{CO_2} + (m\overline{C}p)_{O_2} + (m\overline{C}p)_{P_4} + (m\overline{C}p)_{P_4O_6} + (m\overline{C}p)_{P_4O_{10}}](T-298)$$

$$m\overline{C}p(T-298) = 6.13 \ (T-298)$$

substituting $$1250 + 13{,}800 = 6.13(T-298)$$

$$T-298 = 15{,}050/6.13 = 2450$$

$$T = 2750° \text{ C.}$$

This reaction temperature is an approximation, and a more accurate temperature could be obtained by the simultaneous solution of the equilibrium equations and the energy balance equations.

EXAMPLE II

A composition of matter containing 83% anhydrides of trivalent phosphorus was prepared by the combustion of phosphorus vapor with oxygen and carbon dioxide. The phosphorus vapor was fed to the burner by passing 8.0 gms./min. of carbon dioxide and 6.5 gms./min. of nitrogen through a bed of molten yellow phosphorus at a temperature of 215° C. and a pressure of 44 p.s.i.a. Based on the establishment of equilibrium between the phases, this resulted in a phosphorus feed rate of 4.5 gm./min. in the carbon dioxide-nitrogen mixture. The phosphorus feed stream was superheated to 290° C. and passed through an atomizing nozzle where it was intimately mixed with a 2.5 g./min. stream of oxygen at 260° C. These feed rates created mole ratios, $P_4:O_2:CO_2$, of 1:2.16:5.00. Upon mixing, the phosphorus spontaneously ignited and burned in a four-inch section of ¾″ pipe before being quenched by a water spray at 20° C. The residence time in the reaction zone was calculated to be about 20 milliseconds during which chemical equilibrium was achieved. Quenching was again accomplished in a few milliseconds to a temperature of about 30° C. The water solution was collected and weighed. A sample of the water solution was hydrolyzed for two hours at 100° C., filtered, concentrated by vacuum evaporation, neutralized to pH 9 with NaOH and analyzed by NMR for percentages of trivalent and pentavalent phosphorus compounds. Another sample of water solution was hydrolyzed, filtered, and titrated with NaOH to determine the amount of acid present. The acid titration and the filter cake weight were used to determine the conversion of phosphorus. The conversion of phosphorus was determined as 98.6 mole percent, and the yield of trivalent phosphorus by NMR was 83%. An overall yield of 82% phosphorous acid was obtained.

The adiabatic flame reaction temperature for these conditions is about 1800° C.

EXAMPLE III

A composition of matter consisting essentially of anhydrides of trivalent phosphorus is prepared by the combustion of phosphorus vapor and carbon monoxide with oxygen. The phosphorus vapor is fed to the burner by passing 2.2 g./mn. of carbon monoxide and 9.5 gms./min. of nitrogen through a molten bed of yellow phosphorus at a temperature of 216° C. and a pressure of 42 p.s.i.a. This results in a phosphorus feed rate of 4.9 gm./min. in the carbon monoxide-nitrogen mixture. The phosphorus feed stream is superheated to 285° C. and passed through an atomizing nozzle where it is intimately mixed with a 4.4 gm./min. stream of oxygen at 250° C. These feed rates create mole ratios, $P_4:O_2:CO$, of 1:3.5:2. Upon mixing, the phosphorus spontaneously ignites and burns in a four-inch section of ¾ inch pipe where its residence time is about 15 milliseconds before being quenched in a water spray at 20° C. Quenching occurs to about 100° C. in about 15 milliseconds. The water solution is collected and weighed. A sample of the water solution is hydrolyzed for two hours at 100° C., filtered, concentrated by vacuum evaporation, neutralized to pH 9 with NaOH and analyzed by $P^{31}$NMR for trivalent and pentavalent phosphorus compounds. Another sample of water solution is hydrolyzed, filtered, and titrated with NaOH to determine the acid present. The acid tritration and the filter cake weight are used to determine the conversion of phosphorus. The conversion of phosphorus is 98 mole percent and the yield of trivalent phosphorus by NMR is 90%. This is an overall yield of 88% phosphorus acid.

Using the feed rates and the product analyses, the adiabatic flame temperature is estimated as 2800° C.

EXAMPLE IV

A composition of matter comprising essentially anhydrides of trivalent phosphorus is prepared by the combustion of phosphorus vapor and carbon monoxide with oxygen. The phosphorus vapor is fed to the burner by passing 3.3 g./min. of carbon monoxide and 8.4 gms./min. of nitrogen through a molten bed of yellow phosphorus at a temperature of 216° C. and a pressure of 42 p.s.i.a. This results in a phosphorus feed rate of 4.9 gm./min. in the carbon monoxide and nitrogen mixture. The phosphorus feed stream is superheated to 285° C. and passed through an atomizing nozzle where it is intimately mixed with a 5.1 gm./min. stream of $O_2$ at 250° C. These feed rates create mole ratios, $P_4:O_2:CO$, of 1:4.3. Upon mixing, the phosphorus spontaneously ignites and burns in a four-inch section of ¾ inch pipe where the residence time is about 15 milliseconds before being quenched in a water spray at 20° C. to a temperature of about 75° C. in about 10 milliseconds. The water solution is collected and weighed. A sample of the water solution is hydrolyzed for two hours at 100° C., filtered, concentrated by vacuum evaporation, neutralized to pH 9 with NaOH and analyzed by $P^{31}$NMR. Another sample of water solution is hydrolyzed, filtered, and titrated with NaOH to determine the acid present. The acid titration and the filter cake weight are used to determine the conversion of phosphorus. The conversion of phosphorus is 98 mole percent and the yield of trivalent phosphorus by NMR is 90%. This is an overall yield of 88% phosphorus acid.

Using the feed rates and the product analyses, the adiabatic flame temperature is estimated as 2800° C.

EXAMPLE V

Phosphorous trioxide ($P_4O_6$) was prepared by burning phosphorous vapor with a mixture of oxygen and carbon monoxide. The phosphorus vapor was fed to the nozzle by passing 3.29 gms/min. (.118 mole of carbon monoxide) and 8.25 gms/min. (.295 mole) of nitrogen through a bed of molten yellow phosphorus at a temperature of 209° C. and a pressure of 44 p.s.i.a. This resulted in a phosphorus feed rate of 3.9 gms/min. (.0315 mole) in the carbon monoxide nitrogen mixture. The phosphorus feed stream was super-heated to 260° C. and passed through an atomizing nozzle where it was intimately mixed with 5.12 gms/min. (.160 mole) of oxygen at 230° C. The phosphorous ignited and burned at a temperature of about 2800° C. in a 7-inch section of ¾ inch pipe. The average residence time in the reaction zone was about 30 milliseconds. The hot gases then passed through a ⅛-inch expansion orifice and into an 18 inch length of ¼-inch stainless steel tubing. The outside of the tubing was cooled by 20° C. cooling water. At the exit of the tube, the gases had been cooled to 50°–150° C. The time required for the reaction products to pass through the quench tube was about 45 milliseconds. The quenched gases then passed through two knock-out flasks, a glass wool filter, three cold traps and a water bubbler. After the run, the recovery section of the apparatus was dismantled, and a heated (approximately 40° C.) stream of nitrogen was passed through the various traps and into a cold trap where pure phosphorus trioxide was collected. After this stripping of the phosphorus trioxide was complete, water was added to the residue in the traps, the liquid was hydrolyzed for two hours at 100° C., filtered, concentrated, neutralized to pH 9, and analyzed by $P^{31}$ NMR. The analysis showed a yield of about 75% phosphorus trioxide and the balance being made up of about 20% pentavalent phosphorus oxides and 5% unreacted elemental phosphorus.

EXAMPLE VI

This is an example of a plant-sized unit for producing 3150 lbs./hr. of ethane-1-hydroxy-1,1-diphosphonic acid from a composition comprising essentially anhydrides of trivalent phosphorus as prepared by the present invention. 1000 lbs./hr. molten phosphorus, 1032 lbs./hr. oxygen, and 902 lbs./hr. carbon monoxide (1:4:4 molar ratio) are fed through a pneumatic atomizing style burner nozzle and reacted in a reaction zone having a volume of about 5 cubic feet. The average residence time in the reaction zone is about 100 milliseconds. The hot reaction products which are primarily phosphorus trioxide $P_4O_6$, carbon monoxide and carbon dioxide, exit the reactor zone through a converging-diverging nozzle arrangement from which they are fed directly into the bottom of a packed scrubbing tower. The scrubbing tower is 2 feet in diameter and 20 feet high, and is packed with 1 inch Berl saddles. 5250 lbs./hour of acetic acid are fed to this tower, and a portion of the tower effluent is recycled to the top of the tower to insure adequate wetting of the packing. In this tower the $P_4O_6$ is absorbed in the acetic acid solvent. The solution of $P_4O_6$ in acetic acid from the tower is fed to a series of stirred tanks where it is digested for 45 minutes at 120° C. 1000 lbs./hour of water is mixed with the product from the digestion step and hydrolysis is carried out for 20 minutes at 140° C. After hydrolysis, the hydrolyzed solution is filtered to remove any traces of by-product red phosphorus. Additional water is then added to strip out the excess acetic acid solvent, leaving an aqueous solution of ethane-1-hydroxy-1,1-diphosphonic acid. The solution contains on a solids basis 95% ethane-1-hydroxy-1,1-diphosphonic acid and 5% phosphoric acid.

What is claimed is:

1. A process for the preparation of a composition of matter comprising essentially anhydrides of trivalent phosphorus which comprises the step of reacting elemental phosphorus, oxygen, and at least one carbon oxide at a temperature in excess of about 1500° C. until substantially complete chemical equilibrium is achieved, the reactants being present in a proportion such that when the carbon oxide is carbon monoxide, the molar proportion of elemental phosphorus, oxygen, and carbon monoxide is in the range of from about 1:2.5:1 to about 1:6:15, and when the carbon oxide is carbon dioxide, the molar proportion of elemental phosphorus, oxygen and carbon dioxide is in the range of from about 1:1:10 to about 1:4:1, and maintaining the reaction product in excess of about 1500° C.

2. A process according to claim 1 in which the molar proportion of elemental phosphorus:oxygen:carbon monoxide is in the range of from about 1:3:2 to about 1:5:10.

3. A process according to claim 1 in which the molar proportion of elemental phosphorus:oxygen:carbon dioxide is in the range of from about 1:2:8 to about 1:3:2.

4. A process according to claim 1 in which the reaction temperature is in the range of from about 1500° C. to about 5000° C.

5. A process according to claim 4 in which the temperature is in the range of from about 2500° C. to about 4500° C.

6. A process according to claim 1 in which the reaction time to reach chemical equilibrium is from about 1 millisecond to about 1 second.

7. A process according to claim 6 in which the reaction time to reach chemical equilibrium is from about 5 milliseconds to about 50 milliseconds.

8. A process for the preparation of phosphorus trioxide which comprises the steps of
    (1) reacting elemental phosphorus, oxygen, and at least one carbon oxide at a temperature in excess of about 1500° C. until substantially complete chemical equilibrium is achieved, the reactants being present in a proportion such that when the carbon oxide is carbon monoxide, the molar proportion of elemental phosphorus, oxygen, and carbon monoxide is in the range of from about 1:2.5:1 to about 1:6:15, and when the carbon oxide is carbon dioxide, the molar proportion of elemental phosphorus, oxygen and carbon dioxide is in the range of from about 1:1:10 to about 1:4:1, and
    (2) quenching the hot reaction mixture from Step 1 to a temperature below about 500° C. in a period of less than 3 seconds by passing said hot reaction mixture through a relatively cool zone.

9. A process according to claim 8 in which the quenching step is carried out in less than 1 second.

10. A process for the preparation of phosphorus acid which comprises the steps of
    (1) reacting elemental phosphorus, oxygen, and at least one carbon oxide at a temperature in excess of about 1500° C. until substantially complete chemical equilibrium is achieved, the reactants being present in a proportion such that when the carbon oxide is carbon monoxide, the molar proportion of elemental phosphorus, oxygen, and carbon monoxide is in the range of from about 1:2.5:1 to about 1:6:15, and when the carbon oxide is carbon dioxide, the molar proportion of elemental phosphorus, oxygen and carbon dioxide is in the range of from about 1:1:10 to about 1:4:1, and
    (2) quenching the hot reaction mixture from Step 1 by treating said mixture with water whereby the temperature is reduced to below about 500° C. in a period of less than 3 seconds.

11. A process for the preparation of phosphorus acid as described in claim 10 in which the quenching step is carried out in less than 1 second.

12. A process for the preparation of ethane-1-hydroxy-1,1-diphosphonic acid which comprises the steps of
    (1) reacting elemental phosphorus, oxygen, and at least one carbon oxide at a temperature in excess of about 1500° C. until substantially complete chemical equilibrium is achieved, the reactants being present in a proportion such that when the carbon oxide is carbon monoxide, the molar proportion of elemental phosphorus, oxygen, and carbon monoxide is in the range of from about 1:2.5:1 to about 1:6:15, and when the carbon oxide is carbon dioxide, the molar proportion of elemental phosphorus, oxygen and carbon dioxide is in the range of from about 1:1:10 to about 1:4:1, and (2) quenching the hot reaction mixture from Step 1 by treating said mixture with acetic acid whereby the temperature is reduced to below 500° C. in a period of less than 3 seconds.

13. A process according to claim 12 which includes the steps of digesting the quenched reaction mixture, at a temperature of from about 70° C. to about 170° C. for a period ranging from about 1 minute to about 4 hours, and hydrolyzing the digested mixture at a temperature of from about 90° C. to about 170° C. for a period ranging from a few seconds to about four hours.

References Cited

UNITED STATES PATENTS

| 3,241,917 | 3/1966 | Lapple | 23—165 |
| 3,400,149 | 9/1968 | Quimby et al | 23—165 X |

FOREIGN PATENTS

| 248,332 | 6/1926 | Great Britain. |
| 1,027,679 | 4/1966 | Great Britain. |
| 1,150,958 | 7/1963 | Germany. |

OTHER REFERENCES

Mellor, Compreh. Treat. on Inorg. & Theor. Chem., vol. 8 (1928), pages 898 and 908 relied on.

HERBERT T. CARTER, Primary Examiner

U.S. Cl. X.R.

260—502.4